Oct. 1, 1929.　　　J. B. VIDACH　　　1,729,731
BUMPER
Filed Nov. 14, 1927　　　2 Sheets-Sheet 1
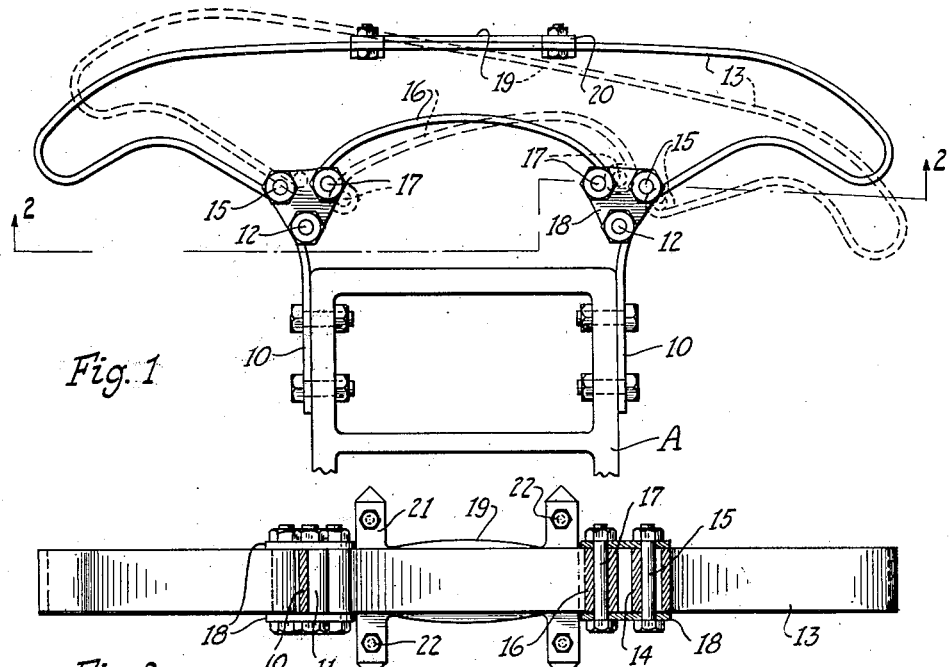
Fig. 1
Fig. 2
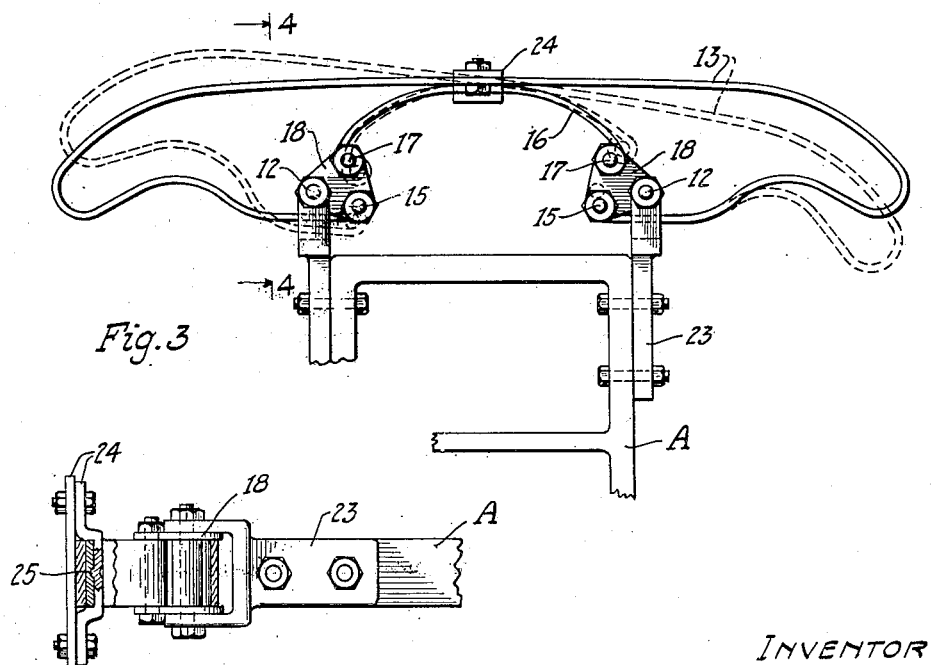
Fig. 3
Fig. 4
INVENTOR:
John B. Vidach
By Lindahl Carter & Carlson
Attys.

Oct. 1, 1929.　　　J. B. VIDACH　　　1,729,731
BUMPER
Filed Nov. 14, 1927　　　2 Sheets-Sheet 2

INVENTOR:
John B. Vidach

Patented Oct. 1, 1929

1,729,731

UNITED STATES PATENT OFFICE

JOHN B. VIDACH, OF CHICAGO, ILLINOIS

BUMPER

Application filed November 14, 1927. Serial No. 232,978.

This invention contemplates a novel vehicle bumper of the type embodying pivotal members or shackles connecting the parts of the bumper.

The general object of the invention is to provide an improved bumper which combines great strength with unusual elasticity, so that shocks occurring from impact of the bumper will be effectively absorbed and reduced with minimum likelihood of damage to the bumper.

Another object of the invention is to produce a novel bumper which functions efficiently to absorb shocks not only from a direct front impact but also from impact with one of the end portions or the extreme end of the bumper, so that a uniform cushioning or shock-absorbing effect is secured regardless of the direction of the force of the impact on the bumper.

A further object is to provide a bumper which embodies pivotal shackles having three pivotal points connecting the various parts of the bumper or its mounting and so arranged as to afford a great range of flexibility and movement of the bumper.

Still another object is to provide a novel bumper comprising pivotal shackles so arranged as to spread apart or tend to straighten the bent or curved bar members of the bumper instead of compressing or further curving the same members as heretofore.

Another object is to provide a simple bumper construction of the character already referred to which is readily adaptable to a single bar or plural bar bumper.

Further objects and advantages of the invention will be understood from the following specification taken in connection with the drawings, in which Figure 1 is a top plan view showing a fragment of the vehicle chassis having mounted thereon a bumper embodying the features of my invention.

Fig. 2 is a rear elevation partly in section on line 2—2 of Fig. 1.

Fig. 3 is a view similar to Fig. 1 but showing an alternative construction.

Fig. 4 is a sectional view in the plane of line 4—4 of Fig. 3.

Figure 5:
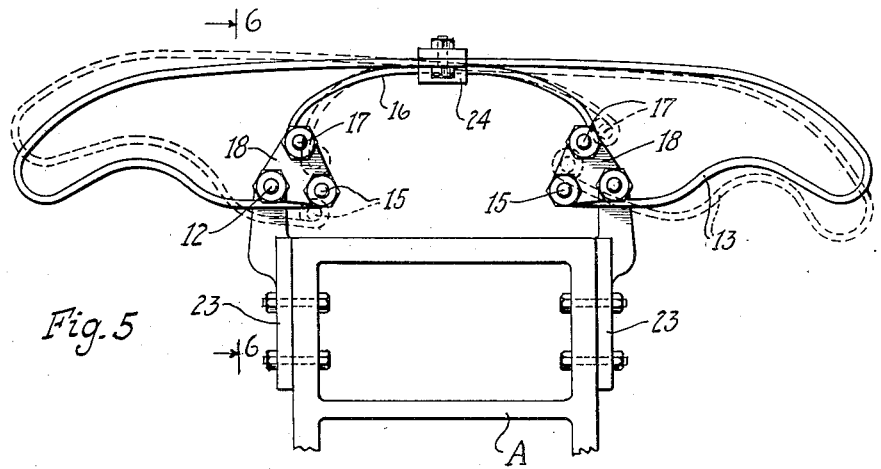
Fig. 5 is a view similar to Fig. 4 but showing the construction modified to accommodate a two-bar bumper.

While my invention is susceptible of various modifications or alternative constructions, some of which are illustrated in the drawings, it should be understood that the present disclosure is illustrative only and is not intended as a limitation upon the scope of the invention as defined in the appended claims.

Referring to the drawings, the letter A designates in all of the figures a fragment of a motor vehicle chassis shown in somewhat conventional or diagrammatic form to which is secured the supports for the bumper proper. These supports may take various forms and may be secured to the chassis in any common or preferred way. In the present discolsure I have shown in each of the alternative constructions a pair of brackets bolted to the sides of the chassis frame and projecting from the ends of the frame to provide an engagement with and support for certain parts of the bumpers.

Referring first more specfically to the particular construction illustrated in Figs. 1 and 2, the supporting means or brackets are there designated 10 and each bracket is provided at its forward end with a vertical bearing 11 to receive the main fulcrum pin or bolt 12 by which the bumper is pivotally supported as will be presently described.

This particular bumper seen in Figs. 1 and 2 comprises a main steel bar 13 having its end portions reversely bent to extend inwardly toward each other, said end portions terminating in bearings 14 (Fig. 2) to receive pivot pins or bolts 15. A secondary bar 16 of bowed formation, which is located inwardly or toward the vehicle in relation to the main bar 13, also has its ends provided with bearings 16 to receive pivot pins or bolts 17. These three bolts 12, 15 and 17 at each end of the bumper pass through a pair of shackles or plates 18, the said bolts being disposed in triangular formation. The said shackles thereby provide a pivotal connection between the two bars 13 and 16 of the bumper and in the form shown in Fig. 1 also provide connection between said two bars and the supporting brackets 10 in such a manner that the pivot 12 provides a fixed fulcrum about which the pivots 15 and 17 may swing.

In view of the fact that bumpers of different motor vehicles are frequently located at different elevations, I have provided a plate 19 which extends along the main bar 13 and has projections 20 extending above and below said bar to increase the effective width or height of the bumper and thereby insure engagement with a bumper of another car. This plate is suitably secured in place by a pair of clips 21 and bolts 22 which embrace the bar 13. By this device the mid-section of the bar 13 is reinforced or strengthened as well as increased in effective dimensions.

The dotted lines in Fig. 1 indicate in a general way the position assumed by the parts of the bumper in case of an impact with the right hand end portion thereof. It will be noted that the pivots 15 and 17 swing around the fulcrum pivot 12 and the bumper as a whole shifts bodily to one side to conform to the direction of impact. It will also be noted from an inspection of the left hand portion of the bumper that the two arms of the U constituting this portion have been spread apart and that the shorter or free arm which normally has a curve or bend in it has been partially straightened out. I have observed that the force necessary to expand or move apart the arms of the U in cases of this kind is greater than is the force required to compress or move together said arms, and the peculiar pivotal and shifting action of my improved bumper makes advantageous use of this characteristic, providing a stronger and stiffer bumper for a given weight or size of bar.

It will also be observed that the inner bar 16 of the bumper due to the shifting of its connecting pivot bolts has been strained in a direction to open or straighten out the bend with the same advantageous result.

The arrangement of the pivotal shackles and their coordination with the other parts of the bumper provides a bumper which is very strong but at the same time very flexible and results in a bumper which conforms itself automatically to impacts from various directions with a minimum danger of permanent distortion or breakage of the parts thereof.

In the modified form of bumper illustrated in Figs. 3 and 4, the mounting brackets 23 are forked at their forward ends, as shown in Fig. 4, to embrace the shackle plates 18. The construction of the bumper is substantially the same as that shown in Fig. 1 but the arrangement of the shackle pivots is somewhat modified. In Fig. 3 the end portions of the main bar 13 project inwardly beyond the fulcrum pivots 12, passing through the forks in the brackets 23; also the inner bar 16 instead of being free from the main bar 13 is secured thereto by a clip 24 comprising two plates which embrace the two bars 13, 16 as best seen in Fig. 4. In order to assist the clips in tightly clamping these bars to prevent slippage I may provide at suitable points interengaging bosses and recesses in the bars and clips as indicated, for example, at 25 in Fig. 4. The action of this bumper when receiving an impact at its right hand end portion is illustrated in dotted lines in Fig. 3.

Figure 6:
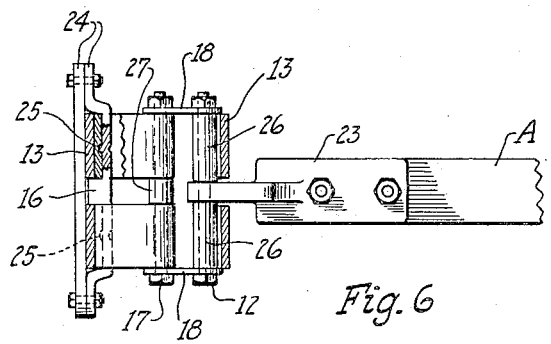
Fig. 6 is a sectional view on line 6—6 of Fig. 5.

Figs. 5 and 6 show a bumper having the same arrangement of parts as in Fig. 3 in so far as the bumper bars, shackles and pivots is concerned but showing this arrangement adapted to a bumper having a main bar 13 and the secondary bar 16 duplicated to provide what is usually termed a double-bar bumper. In this case the forward ends of the supporting brackets 23 instead of being forked are plain or straight, and they receive the main or fulcrum pivot bolt 12 which carries a pair of spacer sleeves 26 above and below the said bracket and between the bracket and the pivotal shackles 18. The bearings at the ends of the bars 13 and 16 which receive the pivot bolts 15 and 17 respectively are likewise spaced apart by sleeves 27 on the respective pivot bolts. A clamp 24 similar to that described in connection with Figs. 3 and 4 but elongated to accommodate the double bar construction is also provided.

Figure 7:
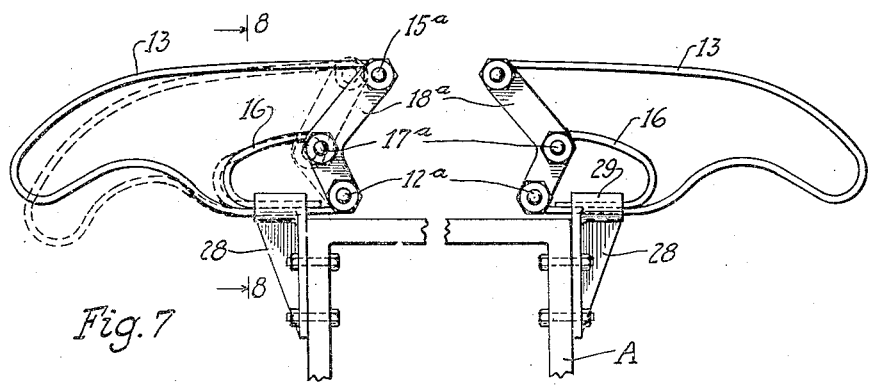
Fig. 7 is a top plan view of another modification of my invention illustrating it as applied to a bumper of the type known as a "bumperette".
Figure 8:
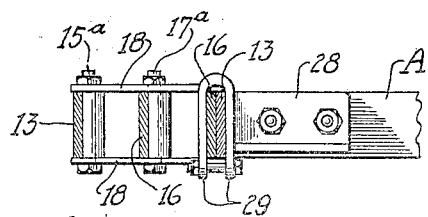
Fig. 8 is a sectional view in the plane of line 8—8 of Fig. 7.

In the construction illustrated in Figs. 7 and 8 each bumper or bumperette, as such a device is commonly known, comprises in effect one half of a complete bumper as shown in the other figures, there being two bumperettes usually located at the rear end of a vehicle, and in practice they may be of such size and so spaced apart as to accommodate between them an accessory such as a spare tire. In the exemplary form shown, each bumperette comprises the main bumper bar 13 of generally U form and the secondary bar 16 of bowed formation, and the device as a whole is mounted on the vehicle by brackets 28 which comprise at their ends clamps 29 to receive and embrace one arm of each of the bars 13, 16, and thereby securely hold the bumperette in place. The pivotal shackles 18$^a$ are connected to the spring bars 13 and 16 by three pivot bolts passing through bearings formed at the ends of the bars in a manner already described, but in this particular modification both ends of the main bar 13 are provided with bearings to receive these pivot bolts while only one end of the bar 16 has such a bearing since its other end is secured in the clamp 29. The pivot bolt 12ª in this case constitutes the fixed fulcrum for the shackles, about which fulcrum the pivots 15ª and 17ª swing as will be apparent from the comparison of the full line and dotted line positions seen in Fig. 7.

I claim as my invention:

1. A vehicle bumper comprising outer and inner spring bars, positioned in different vertical planes one behind the other, and pivotal shackles each connected at two points to the respective bars and at a third point to a fulcrum for supporting said bars.

2. A vehicle bumper comprising outer and inner spring bars, the outer bar being reversely bent into generally U form and a shackle fulcrumed at one point and pivotally connected at two other points to said bars.

3. A vehicle bumper comprising two bowed spring bars and mounting means comprising shackles pivoted to said bars and to a supporting fulcrum and operating to expand or spread both of said bars upon impact against the bumper.

4. A vehicle bumper comprising an outer resilient impact bar having its end portions reversely bent toward each other, an inner bowed resilient bar, a pair of pivotal shackles having three pivot points arranged in triangular relation each shackle being pivotally attached at two of its pivot points to the respective adjacent ends of said two bars, the third pivot point of each shackle constituting a fulcrum about which the other two points may swing upon impact against the bumper, and means for mounting the bumper on a vehicle.

5. A vehicle bumper comprising a resilient bar reversely bent into generally U formation, and means for mounting said bar upon a vehicle including a pivotal shackle attached to said bar and operating to expand or spread apart the arms of the U upon impact against the bumper.

6. A vehicle bumper comprising an impact bar, a pair of pivotal shackles each having three pivot points, one of which constitutes a fulcrum for the shackle, another of which is attached to said impact bar, means attached to the third pivotal point of each shackle and arranged to swing with said shackles about their fulcrums but to resist such swinging movement, and means for mounting the bumper upon a vehicle.

7. A vehicle bumper including an impact bar, a secondary resilient member, and a pair of pivotal shackles each having three pivot points arranged in triangular relation, two of said points of each shackle being attached respectively to said impact bar and said secondary resilient member and the third point of each shackle constituting a fulcrum about which the other points and the parts attached thereto may swing upon impact against said bar.

8. A vehicle bumper comprising outer and inner spring bars, said outer bar arranged to receive the total impact against the bumper, to absorb a part of the impact and to transmit a part to said inner bar, and pivotal shackles each connected at two points to the respective bars and at a third point to a fulcrum for supporting said bars.

9. A vehicle bumper comprising outer and inner spring bars, the outer bar having its ends reversely bent, a pair of shackles, each of said shackles being pivotally attached at two points to the respective adjacent ends of said two bars and pivoted at a third point constituting a fulcrum about which the other two points may swing upon impact against the bumper, and means for mounting the bumper on a vehicle.

10. A vehicle bumper comprising two bowed spring bars operable reversely, one to spread or flatten and the other to compress or further bend upon impact against the bumper, and a pair of shackles pivotally mounted and to which said bars are pivoted.

11. A vehicle bumper comprising outer and inner spring bars, the outer bar having its ends reversely bent, a pair of pivoted shackles to which the adjacent ends of the two bars are pivotally attached, and means for pivotally mounting the bumper on a vehicle.

In testimony whereof, I have hereunto affixed my signature.

JOHN B. VIDACH.